United States Patent
Sato (10) Patent No.: US 10,248,887 B2
(45) Date of Patent: Apr. 2, 2019

(54) OBJECT TRACKING DEVICE AND METHOD

(71) Applicant: Sony Corporation, Tokyo (JP)

(72) Inventor: Yoichiro Sato, Tokyo (JP)

(73) Assignee: SONY CORPORATION, Tokyo (JP)

(*) Notice: Subject to any disclaimer, the term of this patent is extended or adjusted under 35 U.S.C. 154(b) by 10 days.

(21) Appl. No.: 15/479,741

(22) Filed: Apr. 5, 2017

(65) Prior Publication Data

US 2017/0300778 A1 Oct. 19, 2017

(30) Foreign Application Priority Data

Apr. 13, 2016 (CN) .......................... 2016 1 0229116

(51) Int. Cl.
| | | |
|---|---|---|
| G06K 9/62 | (2006.01) | |
| G06T 7/194 | (2017.01) | |
| H04N 5/225 | (2006.01) | |
| H04N 5/232 | (2006.01) | |
| H04N 5/235 | (2006.01) | |
| H04N 9/73 | (2006.01) | |
| H04N 5/222 | (2006.01) | |
| G06T 7/215 | (2017.01) | |
| G06T 7/246 | (2017.01) | |
| G06T 7/277 | (2017.01) | |

(52) U.S. Cl.
CPC ............ *G06K 9/6215* (2013.01); *G06T 7/194* (2017.01); *G06T 7/215* (2017.01); *G06T 7/248* (2017.01); *G06T 7/277* (2017.01); *H04N 5/2226* (2013.01); *H04N 5/2257* (2013.01); *H04N 5/2351* (2013.01); *H04N 5/23212* (2013.01); *H04N 9/735* (2013.01); *G06T 2207/10024* (2013.01); *G06T 2207/20072* (2013.01); *G06T 2207/20076* (2013.01)

(58) Field of Classification Search
CPC ...... G06F 3/011; G06F 3/0346; G06F 3/0304; G06K 9/00221; G06K 9/00335; G06K 9/00369; G08C 17/00; G08C 17/02; H04N 5/2226; A63F 13/213; A63F 13/24; A63F 13/426; A63F 13/428; A63F 13/655; A63F 13/00; G06T 7/73
See application file for complete search history.

(56) References Cited

U.S. PATENT DOCUMENTS

2013/0243312 A1* 9/2013 Sato ..................... G06T 7/0089
382/164

* cited by examiner

*Primary Examiner* — Duy M Dang
(74) *Attorney, Agent, or Firm* — Xsensus LLP (57) ABSTRACT

An object tracking device and method and image shooting apparatus are provided. The object tracking device includes a processor and a memory, wherein the processor includes an image preprocessing module; a super-pixel matching module; and a background masking module configured to mask a super-pixel image having a matching area, in order to obtain a super-pixel masked image whose background area outside of the matching area is masked. The present invention is able to eliminate obstacles from a output area by a way of background masking, accurately and stably tracking the object.

20 Claims, 7 Drawing Sheets

OBJECT TRACKING DEVICE AND METHOD

TECHNICAL FIELD

The present invention is related to the field of computer vision, and more particularly to an object tracking device and method.

BACKGROUND ART

Figure 1A:
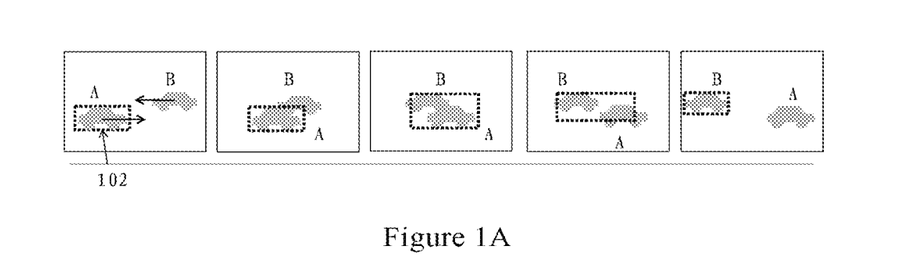
FIGS. 1A and 1B respectively show the tracking processes and tracking results respectively obtained through the prior art and a device and a method provided by the present invention during object tracking.

Target tracking technology is used for auto-focus, auto white balance and auto-exposure to shoot desired images and videos via camera devices. However, referring to FIG. 1A, conventional target tracking methods in which a tracking output rectangle 102, (namely, a tracking output area or a tracking output block) is fitted to the size and the shape of a tracked target A are likely to wrongly track a similar or the same target obstacle B especially when the tracked target A and the obstacle B are partially overlapped, that is, when both the tracked target A and the obstacle B appear in the tracking output rectangle. For example, if the target tracking technology is used in an auto-focus function, wrong tracking results may cause blurred images shot because focused regions in the shot images may be wrong obstacles.

Figure 2A:
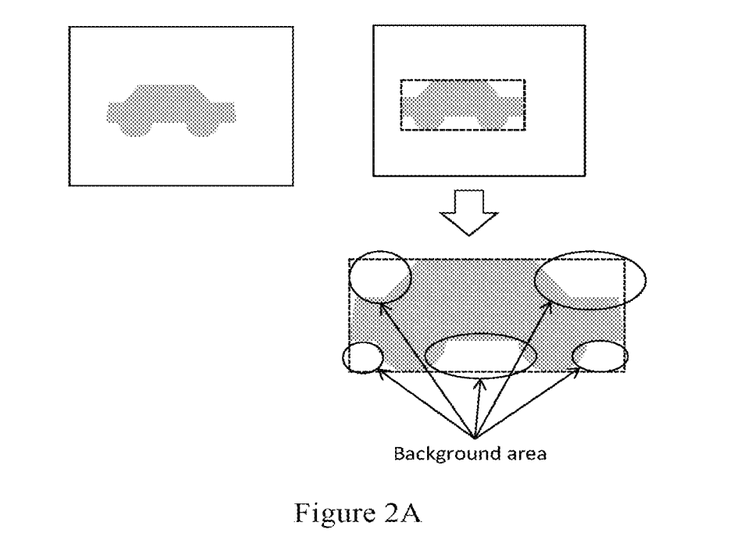
FIG. 2A shows a process that an input image is converted into an output image having an output area (or an output block or an output rectangle) by using the prior art.

Other methods have the same output data format as the conventional target tracking methods. Output information of most conventional target tracking methods is a rectangle which is fitted to the size and the shape of a tracked target. But for the auto-focus function of a camera, this rectangle may cause a low auto-focus accuracy problem. Because the rectangle information contains background areas, an auto-focus module may sometimes focus on a background area inside the tracking output rectangle. For example, referring to FIG. 2A, the input image at the left side is converted, and an image at the right side is outputted. As the tracking output rectangle of the output image comprises a plurality of background areas (for example, five background areas shown in FIG. 2A), the camera may sometimes focus on the background area inside the tracking output rectangle during auto-focus.

SUMMARY

In order to solve technical problems in the prior art of wrongly tracking a similar or same target obstacle, shooting a blurred image or auto-focusing on a background area inside a tracking output rectangle, the present invention provides an object tracking device and method.

According to an aspect of the present invention, there is provided an object tracking device, including a processor and a memory, wherein the processor comprises an image preprocessing module which normalizes a background area of an input image to obtain a normalized image with a fixed-size background area, a super-pixel matching module converts the normalized image into a super-pixel image by use of a super-pixel algorithm and matches the super-pixel image with a reference super-pixel area for a matching area in the super-pixel image which has high degree similarity of super-pixel colors with the reference super-pixel area, and a background masking module masks the super-pixel image with the matching area to mask a super-pixel masked image at the background area which is outside the matching area.

Preferably, the image preprocessing module comprises an object probability estimating sub-module which calculates an object probability of each pixel by using color histograms of a foreground area and a background area, and performs mean shift to shift the foreground area to an appropriate position.

Preferably, the super-pixel matching module converts the object probabilities into a super-pixel level object probability by applying the super-pixel image, the super-pixel level object probability being an average value of the object probabilities having the same super-pixel label.

Preferably, the background masking module is further configured to label super-pixels outside the matching area as a background of the super-pixel masked image and set the background to be black, label super-pixels inside the matching area as a foreground and set the foreground to be white when super-pixel colors inside the matching area are similar with those of the reference super-pixel area, and label other super-pixels inside the matching area as a middle-ground and set the middle-ground to be gray when the other super-pixel colors inside the matching area are not similar with those of the reference super-pixel area.

Preferably, the background masking module applies the super-pixel masked image to the super-pixel level object probability and generates a masked probability map.

Preferably, applying the super-pixel masked image to the super-pixel level object probability and generating the masked probability map further comprises: when the super-pixel masked image is labeled as the foreground, setting the probability of the masked probability map to be 1; when the super-pixel masked image is labeled as the middle-ground, setting the probability of the masked probability map to be the same as an object probability; and when the super-pixel masked image is labeled as the background, setting the probability of the masked probability map to be 0.

Preferably, an object area normalizing sub-module scales a back ground area of an input image to a fixed size with a length-width ratio the same as that of the background area of the input image to obtain a normalized image with the fixed-size background area.

Preferably, the object tracking device comprises an object area estimation module solving a Markov random field (MRF) to generate a super-pixel object binary map, calculate a final output area based on the object binary map, calculate histogram similarities between a color histogram of the output area and a reference histogram of a previous frame to judge tracking succeed, and store super-pixel information of the final output area.

Preferably, the reference super-pixel area is a tracking object area of a previous frame, and the background area of the input image is an initial block of the first frame of the input image or a tracking block of a previous frame of each subsequent image.

According to another aspect of the present invention, there is provided an object tracking method, including: normalizing a background area of an input image to obtain a normalized image with a fixed-size background area; converting the normalized image into a super-pixel image by use of a super-pixel algorithm and matching the super-pixel image with a reference super-pixel area for a matching area in the super-pixel image which has high degree similarity of super-pixel colors with the reference super-pixel area; and masking the super-pixel image with the matching area to mask a super-pixel masked image at the background area which is outside the matching area.

Preferably, the object tracking method further comprises: after normalizing the background area of the input image, calculating an object probability of each pixel by using color histograms of a foreground area and a background area, and performing mean shift to shift the foreground area to an appropriate position.

Preferably, the object tracking method further comprises: converting the object probability into a super-pixel level object probability by applying the super-pixel image, the super-pixel level object probability being an average value of the object probabilities having the same super-pixel label.

Preferably, said masking the super-pixel image with the matching area further comprises: labeling super-pixels outside the matching area as a background of the super-pixel masked image and setting the background to be black; labeling super-pixels inside the matching area as a foreground and setting the foreground to be white when other super-pixel colors inside the matching area are similar with those of the reference super-pixel area; and labeling the super-pixels inside the matching area as a middle-ground and setting the middle-ground to be gray when the other super-pixel colors inside the matching area are not similar with those of the reference super-pixel area.

Preferably, the object tracking method further comprises: applying the super-pixel masked image to the super-pixel level object probability and generating a masked probability map.

Preferably, said applying the super-pixel masked image to the super-pixel level object probability and generating the masked probability map further comprises: when the super-pixel masked image is labeled as the foreground, setting the probability of the masked probability map to be 1; when the super-pixel masked image is labeled as the middle-ground, setting the probability of the masked probability map to be the same as an object probability; and when the super-pixel masked image is labeled as the background, setting the probability of the masked probability map to be 0.

Preferably, said normalizing the background area of the input image further comprises: scaling the background area of the input image to a fixed size with a same length-width ratio as that of the background area of the input image to obtain a normalized image with the fixed-size background area.

Preferably, the object tracking method further comprises: solving a Markov random field (MRF) by an object area estimation module to generate a super-pixel object binary map; calculating by the object area estimation module a final output area based on the object binary map; calculating by the object area estimation module histogram similarities between a color histogram of the output area and a reference histogram of a previous frame to judge tracking succeed; and storing by the object area estimation module super-pixel information of the final output area.

Preferably, the reference super-pixel area is a tracking object area of a previous frame, and the background area of the input image is an initial block of the first frame of the input image or a tracking block of a previous frame of each subsequent image.

According to yet another aspect of the present invention, there is provided an shooting apparatus with an object tracking device. The shooting apparatus comprises the object tracking device, a control module and an image acquisition module, wherein the object tracking device comprises a processor and a memory; the processor comprises an image preprocessing module which normalizes a background area of an input image to obtain a normalized image with a fixed-size background area, a super-pixel matching module configured to convert the normalized image into a super-pixel image by use of a super-pixel algorithm and match the super-pixel image with a reference super-pixel area for a matching area in the super-pixel image which has high degree similarity of super-pixel colors with the reference super-pixel area, and a background masking module which masks the super-pixel image with the matching area to mask a super-pixel masked image at the background area which is outside the matching area is masked; the control module which controls auto-focus, auto-exposure and auto white balance of the shooting apparatus, receive a tracked object from the object tracking device, and generate a control signal; and the image acquisition module receives the shooting control signal from the control module, and acquire an image based on the shooting control signal.

Preferably, the shooting apparatus with the object tracking device further comprises a lens control module which receives a lens control signal from the control module and control a focal length of the lens based on the lens control signal.

According to the embodiments of the present invention, by generating the binary map and the boundary rectangle of the target object area, an auto-focus module is prevented from focusing on a background area inside the output rectangle, and a tracked object partially overlapped with an obstacle whose color is similar or the same with that of the tracked object can be stably tracked. If the tracking method is used in the autofocus function of a camera, the camera can focus on a correct tracked object even if the tracked object is partially overlapped with the obstacle whose color is similar or the same with that of the tracked object. The method provided by the present invention can track any to-be-tracked object selected by a user through a camera's graphical user interface (GUI), and can generate the object binary map which can accurately indicate a tracking object area. By using the object binary map, the camera can keep focusing on the tracking object area with high accuracy.

BRIEF DESCRIPTION OF THE DRAWINGS

In order to illustrate technical schemes of the embodiments provided by the present invention or in the prior art more clearly, a brief introduction may be given hereinafter to the drawings that may be used in the description of the embodiments. Apparently, the drawings in the description below are merely for illustrating some embodiments of the present invention, and other drawings may be obtained by those skilled in the art according to these drawings without paying any creative labor.

DETAILED DESCRIPTION

The technical schemes of the embodiments of the present invention will be described clearly and completely by accompanying drawings afterwards. Apparently, the embodiments described are only part of the embodiments of the present invention, but not all of them, so that all other embodiments obtained by those skilled in the art based on these embodiments shall are within the protective scope of the present invention.

Figure 1B:
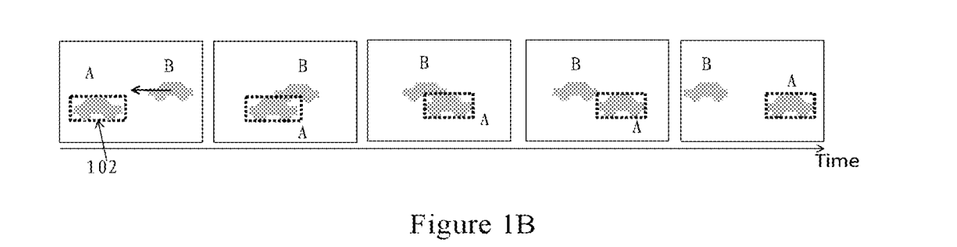

Referring to FIG. 1B, a tracking output rectangle 102 (namely, a tracking output area or a tracking output block) in an object tracking device and method provided by the embodiments of the present invention is fitted to the size and the shape of a tracked target A, even if the tracked target A and an obstacle B are partially overlapped, that is, when the whole obstacle B does not appear in the tracking output block, the object tracking device and method provided by the embodiments of the present invention can stably track the target A, avoiding wrong tracking of the similar or the same object obstacle B.

Figure 2B:
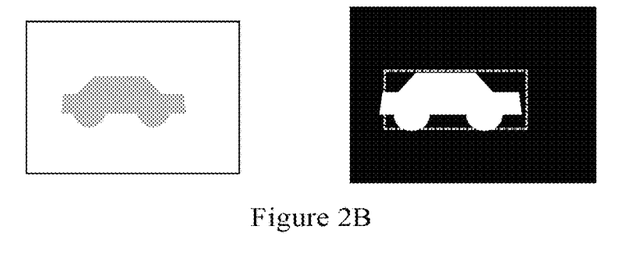
FIG. 2B shows a process that an input image is converted into an object binary map of a limiting rectangle via the device or method provided by the present invention.

Referring to FIG. 2B, in the embodiments of the present invention, by generating the binary map and the boundary rectangle of the target object area, an auto-focus module is prevented from focusing on a background area inside the output rectangle, and a tracked object partially overlapped with an obstacle whose color is similar or the same with that of the tracked object can be stably tracked.

The object (a tracked object or a tracked target) tracking device and the object tracking method will be described in detail below respectively with reference to the drawings.

Figure 3:
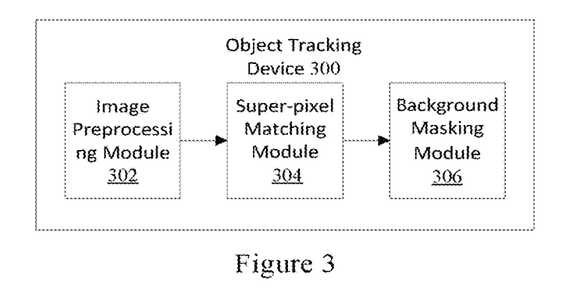
FIG. 3 is a block diagram of an object tracking device according to a first embodiment of the present invention.

FIG. 3 is a block diagram of an object tracking device according to a first embodiment of the present invention. Referring to FIG. 3, the object tracking device 300 comprises a processor and a memory (not shown in the FIG. 3). The processor comprises an image preprocessing module 302 configured to normalize a background area of an input image to obtain a normalized image with a fixed-size background area, a super-pixel matching module 304 configured to convert the normalized image into a super-pixel image by use of a super-pixel algorithm and match the super-pixel image with a reference super-pixel area to find a matching area which has highly similar super-pixel colors with the reference super-pixel area from the super-pixel image, and a background masking module 306 configured to mask the super-pixel image with the matching area to obtain a super-pixel masked image whose background area outside the matching area is masked.

The object tracking device according to the first embodiment of the present invention can stably track an object when the tracked object and an obstacle are overlapped to overcome defects such as wrong tracking etc., and can track the object more accurately compared with the prior art.

Figure 4:
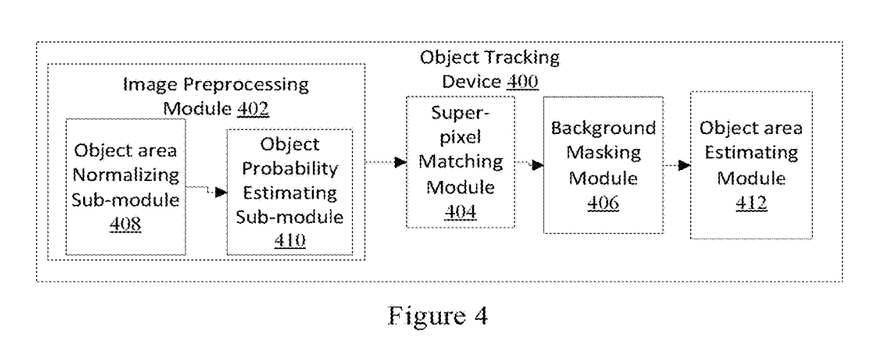
FIG. 4 is a block diagram of an object tracking device according to a second embodiment of the present invention.

FIG. 4 is a block diagram of an object tracking device according to a second embodiment of the present invention. Referring to FIG. 4, the object tracking device 400 comprises a processor and a memory (not shown in the FIG. 4). The processor comprises an image preprocessing module 402, a super-pixel matching module 404, a background masking module 406, and an object area estimation module 412, wherein the image preprocessing module 402 comprises an object area normalizing sub-module 408 and an object probability estimating sub-module 410. These modules will be described in detail hereinafter.

The object area normalizing sub-module 408 is configured to normalize a background area of an input image to obtain a normalized image with a fixed-size background area. Particularly, the object area normalizing sub-module 408 is configured to scale the background area of the input image to a fixed size via a length-width ratio the same as that of the background area of the input image to obtain the normalized image with the fixed-size background area. Particularly, the length-width ratio of the background area of the normalized image is the same as that of the background area of the input image. Preferably, the background area of the input image is an initial block of the first frame of the input image or a tracking block of a previous frame of each subsequent image.

Figure 5:
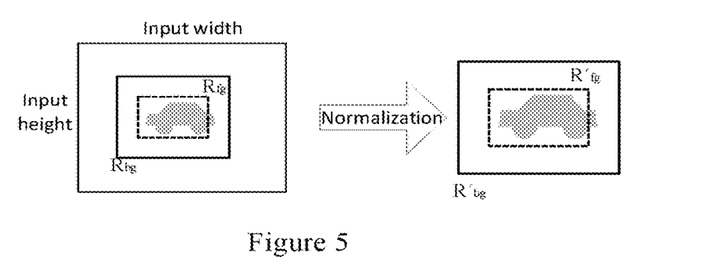
FIG. 5 is a schematic diagram showing normalization of an input image by an object area normalizing sub-module.

FIG. 5 is a schematic diagram showing normalization of an input image by an object area normalizing sub-module. The object area normalizing sub-module will be described in detail below with reference to FIG. 5.

In the object area normalizing sub-module 402, the background area of the input image is reduced to a fixed size. The background area is defined as a first rectangle $R_{fg}$ (or a region or a block) and a second rectangle $R_{bg}$, wherein the first rectangle $R_{fg}$ is the object tracking rectangle of a previous frame. The second rectangle $R_{bg}$ is generated by adding margins to the width and height directions. The margin is calculated through the width and the height of the first rectangle $R_{fg}'$ of the normalized image according to the following formulas:

$$\text{margin} = (w_{fg} + h_{fg})/\alpha \quad \text{(Formula 1)},$$

$$x_{bg} = x_{fg} - \text{margin} \quad \text{(Formula 2)},$$

$$y_{bg} = y_{fg} - \text{margin} \quad \text{(Formula 3)},$$

$$w_{bg} = w_{fg} + 2*\text{margin} \quad \text{(Formula 4), and}$$

$$h_{bg} = h_{fg} + 2*\text{margin} \quad \text{(Formula 5s)}.$$

In the Formula 1, $x_{fg}$, $y_{fg}$, $x_{bg}$, and $y_{bg}$ are x coordinate values and y coordinate values of the first rectangle region and the second rectangle region respectively, and a is an adjustable parameter for determining the length of the margin. The size of the rectangle $R'_{bg}$ of the normalized image is determined according to the rectangle $R_{bg}$. The length-width ratio of the rectangle $R'_{bg}$ is the same as that of the rectangle $R_{bg}$, and the longest side (i.e., the width) of the rectangle $R'_{bg}$ is a fixed length predefined by a user. Image data of the rectangle $R_{bg}$ is normalized to form the $R'_{bg}$ via an interpolation method. For example, the interpolation method includes a nearest neighbor interpolation method, a bilinear interpolation method and a bicubic interpolation method. The range of a value is from 3.0 to 5.0. In the object probability estimation unit, this range of α is determined empirically for getting an appropriate object probabilities. If the value of a is too large, the object probabilities of the rectangle $R'_{bg}$ are too high (because the probability of most colors will be 1.0). On the other hand, if the value of α is too small, the object probabilities of the rectangle $R'_{bg}$ are too small to use as a tracking component.

The purpose of the normalization is to perform fast running by reducing the image data to the fixed size, and the normalization of the target object area is used for super-pixel matching. A subject sizes in a sequence images are different, normalization is performed to execute the super-pixel matching.

The image preprocessing module 402 further comprises an object probability estimating sub-module 408. The object probability estimating sub-module 408 is configured to calculate an object probability of each pixel by using a color histogram of a foreground area and a background area, and perform mean shift to shift the foreground area to an appropriate position.

Figure 6:
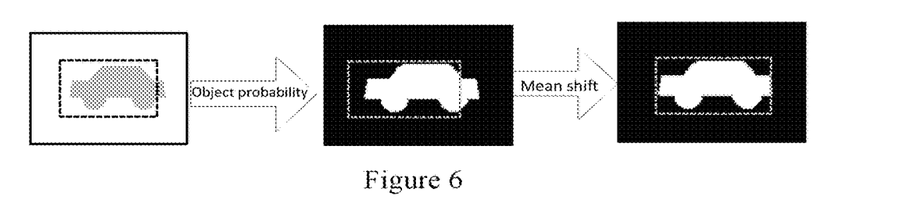
FIG. 6 is a schematic diagram showing object probability estimation and mean shift of a normalized image by an object probability estimating sub-module.

FIG. 6 is a schematic diagram showing object probability estimation and mean shift of a normalized image by the object probability estimating sub-module. In the object probability estimating sub-module 410, an object probability is calculated by the following formula:

$$p(obj | c_i) = \frac{p(c_j, obj)}{p(c_i)}, \quad \text{(Formula 6)}$$

wherein $c_i$ represents a color with the value of i, the value of i is determined depending on color space sizes of following images, for example, in a gray image, the value of i is [0,255], and in an RGB image, the value of i is [0,255*255*255];
Wherein the obj is an object area (also called as a target region);
$p(c_i)$ is a distribution probability of the color $c_i$;
$p(c_i, obj)$ is a distribution probability of the color $c_i$ in the object area; and
$p(obj|c_i)$ is the ratio of the two above probabilities and serves as a pixel value of a pixel with the color $c_i$ in the whole confidence map.

The larger the ratio of the two distribution probability is, the greater the probability that the color belongs to the object area is.

Figure 19:
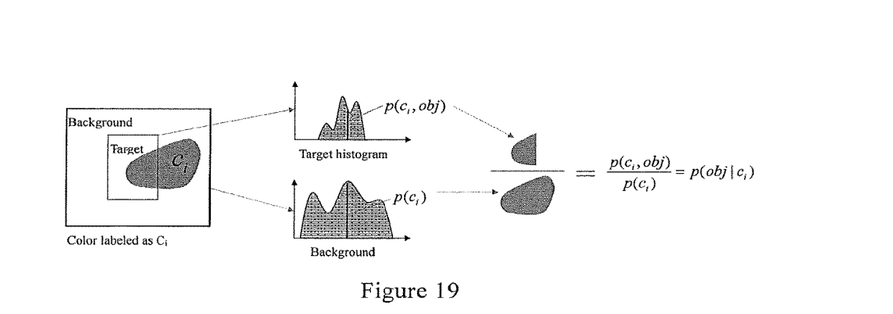
FIG. 19 is a schematic diagram illustrating extraction of a color histogram and calculation of a Bayesian probability graph according to an embodiment of the present invention.

Hereinafter, extraction of a color histogram and calculation of a Bayesian probability graph will be described with reference to FIG. 19. First, some kind of color in a normalized image is labeled as $c_i$, which corresponds to a Bin in the color histogram. For example, this kind of color may be red, yellow, blue, pink or the like in the normalized image. A target histogram is drawn based on a calculated distribution probability of the color in the target region. A background histogram is drawn based on the calculated distribution probability of the color in the background area. Then, a ratio of the area of the color in the target region to that in the background area is calculated by the formulation 6 above, and the ratio represents the Bayesian probability value of color $c_1$.

Figure 20:
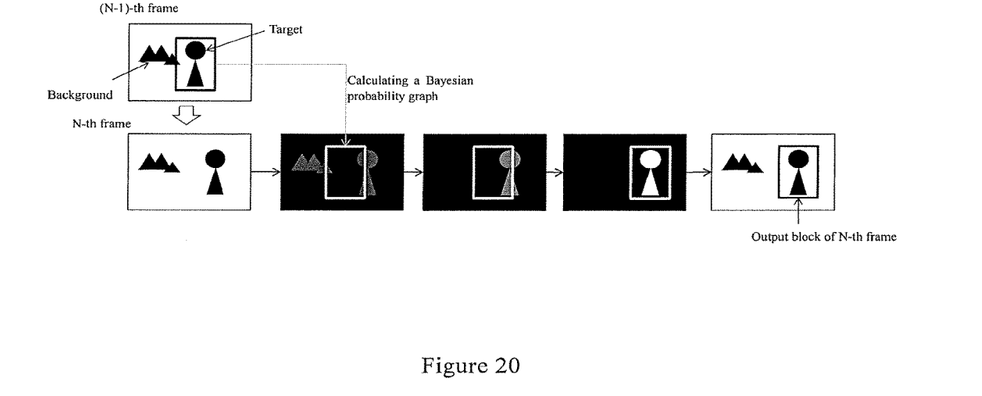
FIG. 20 is a schematic diagram illustrating mean shift of the Bayesian probability graph according to an embodiment of the present invention.

Then, mean shift is performed to get a more accurate object probability map to enable the object rectangle to fit to an object position of the current block. In the following modules of the method, a rectangle in the mean shift output is not used, but an object probability map based on the color histogram is used. FIG. 20 is a schematic diagram illustrating mean shift of the Bayesian probability graph according to an embodiment of the present invention. As shown in FIG. 20, first, the Bayesian probability graph of a previous frame (such as the (N−1)-th frame) is acquired; a current frame (such as the N-th frame) of Bayesian probability graph applies the target block of a previous frame; a gravity center of the probability in the target block is calculated on the Bayesian probability graph, a position of the target block is updated to enable a center and the gravity center in the target block to be coincided, and meanwhile, a Bayesian probability graph is re-calculated by using a new target block; and next, the position of target block is updated in a repeated iteration manner, the Bayesian probability graph is re-calculated, moving of the target block cannot be stopped until the position of the target block is converged and stable, and finally, a result is outputted.

The super-pixel matching module 404 is configured to convert the normalized image into a super-pixel image by use of a super-pixel algorithm and match the super-pixel image with a reference super-pixel area to find a matching area which has highly similar super-pixel colors with the reference super-pixel area from the super-pixel image. The reference super-pixel area is a tracking object area of a previous frame. The super-pixel matching module 404 is further configured to convert object probabilities into a super-pixel level object probability by applying the super-pixel image, the super-pixel level object probability being an average value of the object probabilities having the same super-pixel label, wherein calculating the super-pixel masked image further comprises: labeling super-pixels outside the matching area as a background of the super-pixel masked image and setting the background to be black; labeling super-pixels inside the matching area as a foreground when super-pixel colors inside the matching area are similar with those of the reference super-pixel area and setting the foreground to be white; and labeling the super-pixels inside the matching area as a middle-ground when other super-pixel colors inside the matching area are not similar with those of the reference super-pixel area and setting the middle-ground to be gray.

Figure 7:
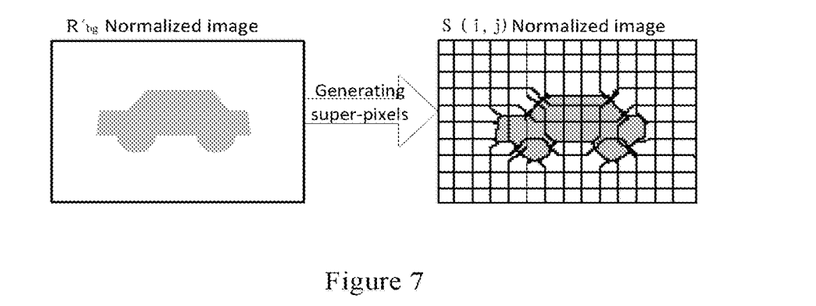
FIG. 7 shows a schematic diagram of generating a super-pixel image based on the normalized image.

The super-pixel matching module 404 may be functionally divided into a super-pixel generating module and a super-pixel matching module. FIG. 7 shows a schematic diagram of generating a super-pixel image based on the normalized image. In the super-pixel generating module, the super-pixel image is generated by using a super-pixel algorithm such as grid seams super-pixel. Here, in order to perform super-pixel matching, the super-pixel algorithm in which the width and the height of the super-pixel image are controllable may be used. The purpose of generating super-pixels is to reduce the effect of a small background area having the same color with the target object. If information for object area estimation is used, a plurality of pixel noise regions will be generated because of pixel level data. But by using the super-pixel, the effect of the pixel noise regions which have the same color with the target region can be reduced because small pixel noise regions are ignored in the super-pixel image.

The optimal size of the super-pixel scan be determined according to the minimum super-pixel size which is able to ignore the effect of pixel noises. In the case of the grid seams, a square grid of 5*5 pixels is enough to reduce the effect of the pixel noises. The other reason for generating the super-pixels is to reduce calculation costs of following modules. For example, if $R'_{bg}$ normalized image has 300*200 pixels, the size of the super-pixel image S(i,j) is reduced to 60*40 super-pixels. The amount of data is reduced by 25 times.

Figure 8:
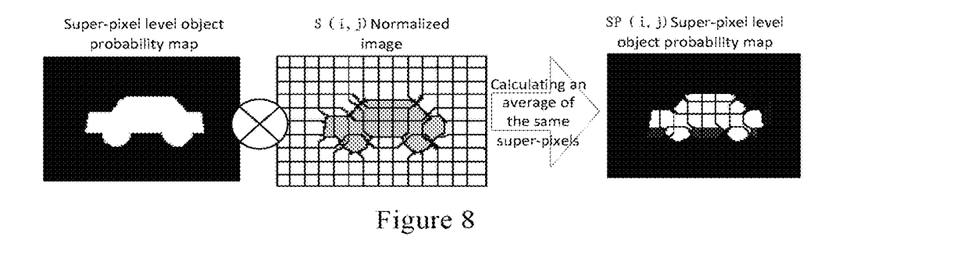
FIG. 8 shows a schematic diagram of converting pixel level object probabilities into a super-pixel level object probability.

FIG. 8 shows a schematic diagram of converting pixel level object probabilities into super-pixel level object probability. A super-pixel level object probability image is generated by applying a super-pixel image S(i,j) to a pixel-level object probability image. Therefore, the object probabilities are also converted into the super-pixel level probability SP(i,j). The super-pixel level probability is the average value of the object probabilities with the same super-pixel label.

Figure 9:
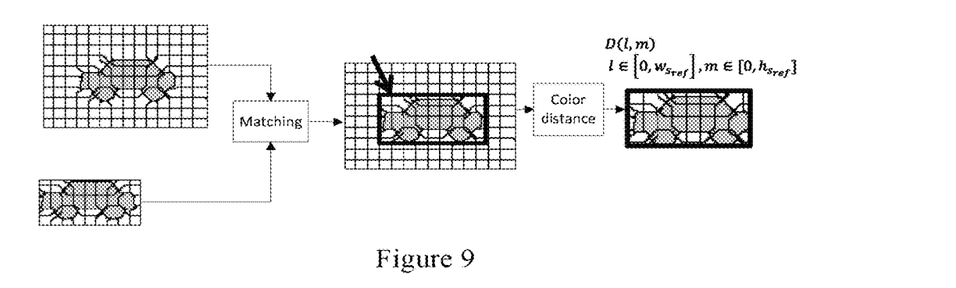
FIG. 9 shows a schematic diagram of performing super pixel matching by a super-pixel matching module.

FIG. 9 shows a schematic diagram of performing super pixel matching by the super-pixel matching module. In the super-pixel matching module, the super-pixel image S(i,j) of a current frame and the super-pixel $S_{ref}(l,m)$ of a previous frame are matched. To find a matching area, the sad (sum of absolute distance) is calculated as a matching score.

$$\text{sad} = \sum_{l=0}^{w_{s_{ref}}} \sum_{m=0}^{h_{s_{ref}}} |S(x+l, y+m) - S_{ref}(l, m)|, \quad \text{(Formula 7)}$$

wherein $x \in [0, w_s - w_{s_{ref}} + 1], y \in [0, h_s - h_{s_{ref}} + 1]$.

$$R_m = (x_s, y_s, w_{s_{ref}}, h_{s_{ref}}), \quad \text{(Formula 8)}$$

wherein $(x_s, y_s)$ represents the position of the minimum sad; $x_s$ and $y_s$ of rectangle $(x_s, y_s, w_{s_{ref}}, h_{s_{ref}})$ represent x and y coordinates of the upper left corner; $w_{s_{ref}}$ and $h_{s_{ref}}$ of rectangle $(x_s, y_s, w_{s_{ref}}, h_{s_{ref}})$ represent the width and the height of the reference super-pixel $S_{ref}(l,m)$ of a previous frame.

In the above process, $|S(x+l, x+m) - S_{ref}(l,m)|$ is the distance of an average color of super-pixels. If an evaluated super-pixel color of a current frame is very similar to a super-pixel color $S_{ref}(l,m)$ of the reference frame, the minimum sad is zero. The position of the minimum sad is calculated by window scanning $S_{ref}(l,m)$ in S(i,j). The scanning performed in the super-pixel is faster than common template matching in pixel image data. Finally, $R_m$ is the output matching region whose width and height are the same as those of $S_{ref}(l,m)$. After super-pixel matching, the color distance D(l,m) between the reference super-pixel and a matched super-pixel is the distance of the average color of the super-pixels. These color distances are used for following processing.

The background masking module 406 is configured to mask a super-pixel image having a matching area to obtain a super-pixel masked image whose background area outside the matching area is masked. When the super-pixel masked image is labeled as the foreground, the probability of the masked probability map is 1; when the super-pixel masked image is labeled as the middle-ground, the probability of the masked probability map is same as an object probability; and when the super-pixel masked image is labeled as the background, the probability of the masked probability map is zero. Particularly, applying the super-pixel masked image to the super-pixel level object probability to generate the masked probability map further comprises: when the super-pixel masked image is labeled as the foreground, the probability of the masked probability map is 1; when the super-pixel masked image is labeled as the middle-ground, the probability of the masked probability map is same as an object probability; and when the super-pixel masked image is labeled as the background, the probability of the masked probability map is zero.

Figure 10:
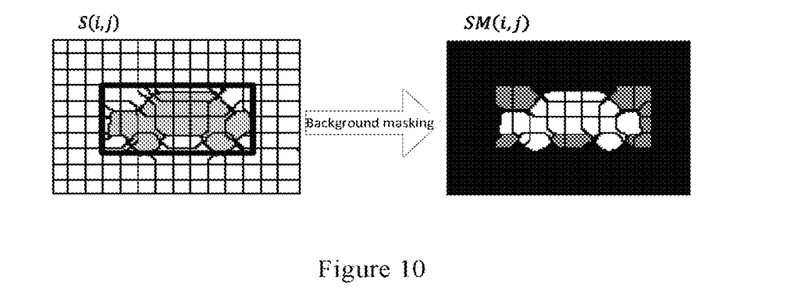
FIG. 10 shows a schematic diagram of performing background masking on a super-pixel image having a matching area.
Figure 11:
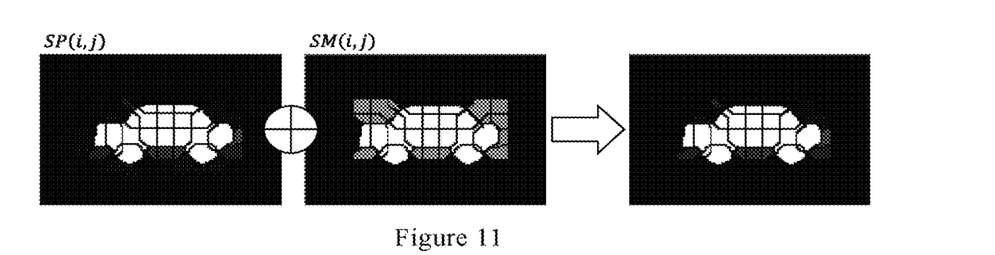
FIG. 11 shows a schematic diagram of converting a super-pixel level object probability map into a masked probability map.

FIG. 10 is a schematic illustration of background masking of a super-pixel image with a matching area; and FIG. 11 is a schematic diagram of converting a super-pixel level object probability map into a mask probability map.

To estimate SMP(l,m), a masked image SM(l,m) is calculated in the first step. SM(l,m) has three types of labels, namely, a background, a middle-ground and a foreground. In order to determine a value of SM(l,m), a matching area in super-pixel matching is used firstly. It can be considered that super-pixels outside the matching area $R_m$ do not belong to the target region, therefore, SM (l,m) of corresponding super-pixels is labeled as the background. Other super-pixels inside $R_m$ are labeled as the middle-ground or the foreground. If color distance D(l,m) of the super-pixel is smaller than a threshold and a corresponding reference super-pixel $S_{ref}(l,m)$ is labeled as the foreground, SM(l,m) is labeled as the foreground. Because the probability that super-pixels inside the matched super-pixels have the same labels with the super-pixels of a previous frame is high, other pixels whose color distance D(l,m) is large are labeled as the middle-ground. The middle-ground super-pixel may be a background area because its color is changed from the previous frame color due to deformation of a target object.

Whether the super pixel color of S(i,j) is similar with the reference super-pixel color is determined based on the matched sad value calculated in the super-pixel matching module. If the sad value is large, a threshold is set to be larger accordingly; and if the sad value is small, the threshold is set be smaller. The reason for using an adaptive threshold is to prevent an incorrect masking label from being derived from wrong super-pixel segmentation. The value of the color distance D(l,m) changes according to not only the difference of sequence images but also the change of super-pixel division segmentation accuracy. If a super-pixel contains incorrect pixels because of low accuracy of super-pixel segmentation, D(l,m) may take a large value. The sad value is the sum of color distance D(l,m) in $R_m$, and is a good measured value of the super-pixel segmentation accuracy and the reliability of the D(l,m).

In order to remove background areas with high probabilities (as the background areas have similar or the same colors with the target object), SM(l,m) is applied to SP(i,j), and a masked probability graph SMP(i,j) is generated. If the label of SM(l,m) is foreground, the probability of SMP(i,j) is 1. If the label of the SMP(i,j) is middle-ground, the probability same with that of the SM(l,m) is used in the probability of SMP(i,j). If the label of SM(l,m) is background, the probability of SMP(i,j) is 0. By applying the SM(l,m) to SP(i,j), the masked probability graph SMP(i,j) is generated to mask non-object areas with similar colors.

The mask processing is particularly effective in the case that a target object is partially overlapped with an obstacle whose color is similar with that of the target object. When the obstacle with the similar color approaches the target object, an object probability of the obstacle in SP(i,j) is high.

However, by applying SM(l,m), a wrong region which has the high object probability is removed.

The object area estimation module 412 is configured to solve a Markov random field (MRF) to generate a super-pixel object binary map, calculate a final output area based on the object binary map, calculate a histogram similarity between a color histogram of the output area and a reference histogram of a previous frame to judge tracking succeed, and store super-pixel information in the final output area.

Figure 12:
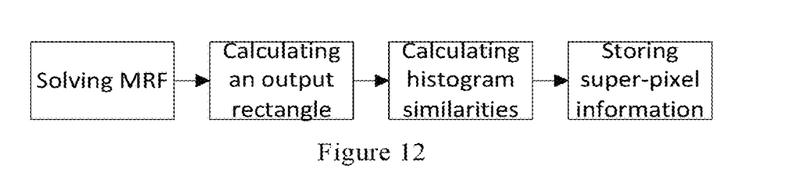
FIG. 12 shows a schematic diagram of performing object area estimation by an object area estimation module.

FIG. 12 is a schematic diagram of object area estimation performed by an object area estimation module. Particular examples of the object area estimation module will be described in detail below with reference to FIG. 12.

The object area estimation module has four functions.

1) Solving the MRF problem to get an object binary map in super-pixels, wherein the process comprises the following six steps.

In the object area estimation module, the binary map of an object area SB(i,j) is estimated by inputting a super-pixel probability of SMP(i,j). The SB(i,j) represents one of labeled images of foreground and background. If the label of the object area is background, a corresponding super-pixel belongs to a tracking object area; and if the label of the object area is foreground, a corresponding super-pixel belongs to a non-tracking object area.

In order to estimate the binary map of the object area, it is required to solve the MRF (Markov rand field) problem. The MRF is an undirected graph model and super-pixel image can be treated as a graphical structure data which have probability nodes and connected margins. For example, LBP (Loopy Belief Propagation) is used for acquiring the object binary map, wherein the LBP is one of the simplest solutions for the MRF problem.

In the first step, an image data structure is generated.

Figure 13:
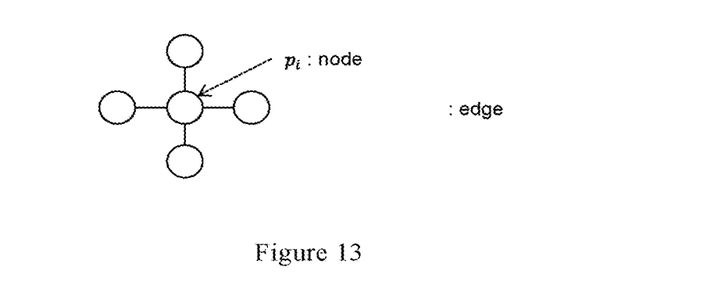
FIG. 13 is a schematic diagram of an image data structure.

FIG. 13 is a schematic diagram of the image data structure. Referring to FIG. 13, the graphical data structure is composed of nodes and edges. Each node contains the probability $p_i$ of the super-pixel i. Edges are indexes of adjacent super-pixels with a node. All super-pixels are initialized by node and edge information.

In the second step, a message weight $w_{ik}$ of adjacent super-pixels is calculated.

Figure 14:
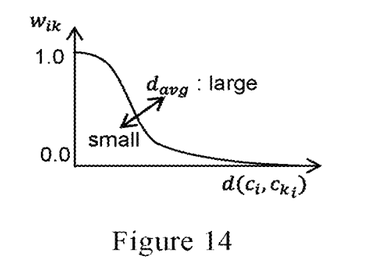
FIG. 14 is a curve diagram of message weights of adjacent super-pixels and the sums of absolute distances between super-pixels i and k.

FIG. 14 is a curve diagram of the message weights of adjacent super-pixels and the sums of absolute distances between super-pixels i and k. The message weights represent influence from adjacent super-pixels. If the color of the super-pixel i is similar with that of the adjacent super-pixel k, influence from k to i is large. This means that if the adjacent super-pixels i and k have the same color, it can be considered that the super-pixels i and k have the same object area.

$$d(c_i, c_k) = \sum_{\in RGB} |c_i - c_k|,\quad \text{(Formula 9)}$$

$$d_{avg} = \frac{1}{N}\sum_i^N \sum_k d(c_i, c_k),\ \text{and}\quad \text{(Formula 10)}$$

$$w_{ik} = \exp\left(-\beta \frac{d(c_i, c_{k_j})^2}{d_{avg}^2}\right),\ \text{wherein}\quad \text{(Formula 11)}$$

$\beta$ is an adjustable parameter; $d(c_i, c_k)$ is the sum of absolute distances between the super-pixels i and k; $d_{avg}$ is the average value of all $d(c_i, c_k)$; the weight $w_{ik}$ can be considered as gaussian distribution of $d(c_i, c_k)$ and $d_{avg}$; if $d(c_i, c_k)$ is large, the weight $w_{ik}$ would be low; the $d_{avg}$ is used for controlling the gradient of the Gaussian distribution; and if $d_{avg}$ is small, a curve of the $w_{ik}$ is steep.

In the third step, energies are calculated.

The energies of the super-pixel i for labeling the foreground and the background are calculated based on $p_i$ and $w_{ik}$.

$$e_{bg_i} = |p_i + \Sigma_k w_{ik}|P_k|\quad \text{(Formula 12), and}$$

$$e_{fg_i} = |1-p_i + \Sigma_k w_{ik}|1-p_k|\quad \text{(Formula 13), wherein}$$

$e_{fg_i}$ and $e_{bg_i}$ are energies to label super-pixel i as the foreground and the background, and preferably, smaller energy's label is for labeling.

In the fourth step, the probability is calculated.

The probability pi of the super-pixel i is updated by sending a message. The foreground energy value is smaller, $$p_i' = p_i + \frac{1 - e_{fg_i}}{1 + \gamma e_{fg_i}} : \text{if } e_{fg_i} < e_{bg_i};\ \text{and}\quad \text{(Formula 14)}$$

the background energy value is smaller, $$p_i' = p_i - \frac{1 - e_{bg_i}}{1 + \gamma e_{bg_i}} : \text{if } e_{fg_i} \geq e_{bg_i}.\quad \text{(Formula 15)}$$

In the above formulas for probability update, y is a parameter for determining the maximum amount of messages. If y is small, a large number of messages is conveyed. Therefore, y is a parameter that controls a quickness of the LBP convergence.

In the fifth step, the total energy is calculated.

The total energy is calculated to judge whether message transmission is completed. The total energy is defined as follows.

$$b_i = \begin{cases} 1: p_i' > \text{threshold} \\ 0: p_i' \leq \text{thershold} \end{cases},\ \text{and}\quad \text{(Formula 16)}$$

$$E = \Sigma_i^N |b_i - p_i'|\quad \text{(Formula 17)}.$$

The threshold is determined by super-pixel level object probabilities in the super-pixel generating module. It is the average of probabilities inside $R'_{bg}$.

$b_i$ is a temporal label of the foreground (which value is 1) or the background (which value is 0). During each step 5 of iterations, $b_i$ of each super-pixel is computed to estimate a current stability level of a message transmission state. E is the total energy value, and if all $b_i$ are close to 1 or 0, E is converged to a stable state (which value is 0).

The $p_i'$ serves as an input probability for next iteration of the LBP.

If E is converged, the LBP loop is completed and next step 6 is executed.

In the sixth step, a final label is determined.

After convergence of the total energy, the label $l_i$ of each super-pixel is determined based on $p_i'$. If $l_i$ is larger than a threshold, the super-pixel i is labeled as the foreground ($l_i=1$). If $l_i$ is not larger than the threshold, the super-pixel i is labeled as the background ($l_i=0$), wherein $$l_i = \begin{cases} 1 : p'_i > \text{threshold} \\ 0 : p'_i \leq \text{threshold} \end{cases} \quad \text{(Formula 18)}$$

2) A final output rectangle based on the object binary map technique.

After estimating the binary map of an object area SB(i,j), an output block is calculated for the following tracking input of the block. In the output rectangle computation, two candidate rectangles are generated. Then, the output rectangle is calculated by merging the two candidate rectangles. This process comprises the following four steps.

In the first step, the first candidate rectangle is generated.

First, the center position of foreground labels is calculated in SB(i,j) image. Then, a rectangle whose width and height are the same with those of the tracking block of a previous frame is applied, so that its center position is same with that of the foreground labels. This rectangle is the first candidate rectangle.

In the second step, the second candidate rectangle is generated

A rectangle which bounds foreground area in SB(i,j) is calculated by using object binary map information. This rectangle is the second candidate rectangle.

In the third step, a histogram similarity is calculated.

Two histograms are generated based on the object area normalizing sub-module. Then, the color histogram similarities are calculated by comparing the two histograms (a candidate rectangle histogram and a reference histogram). Finally, the histogram similarities are calculated by using the Bhattacharyya distance.

In the fourth step, the two candidate rectangles are merged.

The two candidate rectangles are merged into an output rectangle. The similarity value is used as a weight for merging the two candidate rectangles. The weight of the two candidate rectangles is calculated as follows.

The width and the height of the output rectangle are a weighted sum of the first candidate rectangle and the second candidate rectangle.

The merge processing makes a tracking result very stable. The second candidate rectangle is abounding rectangle of an object binary map generated by the MRF. However, a foreground area estimated by the MRF sometimes contains a background because of super-pixel segmentation error or the like. Especially, when the color histogram of the first candidate rectangle similar with a reference color histogram than that of the second candidate rectangle, the color histogram of the first candidate rectangle prevents from stretching a bounding rectangle to background region.

3) Calculating a histogram similarity.

The histogram similarity between the color histogram of the output rectangle and reference histogram of the first frame is calculated to judge tracking succeed. A confidence value of the output tracking rectangle is outputted as a tracking confidence score. Therefore, the color histogram similarity of the reference color histogram and the output color histogram is compared. A measured value of the histogram similarity is the Bhattacharyya distance. The similarity value is the tracking confidence score. If the similarity is lower than a threshold, a tracking result is considered as wrong. Particularly, for the Bhattacharyya distance, the threshold ranges from 0.8 to 0.9. If the value is too small, the output rectangle is likely to move to the background area. However, if the threshold is too large, tracking is likely to fail.

4) Saving (or storing) Super-pixel information in the final output rectangle

In the final step, the super-pixel information is saved for the next frame's tracking process. This SB(i,j) is an object binary map estimated by the MRF. SB(i,j) information and output rectangle information are stored in a memory. A super-pixel inside the output rectangle is used as a reference super-pixel $S_{ref}$ used in the next frame's super-pixel matching module.

Figure 15:
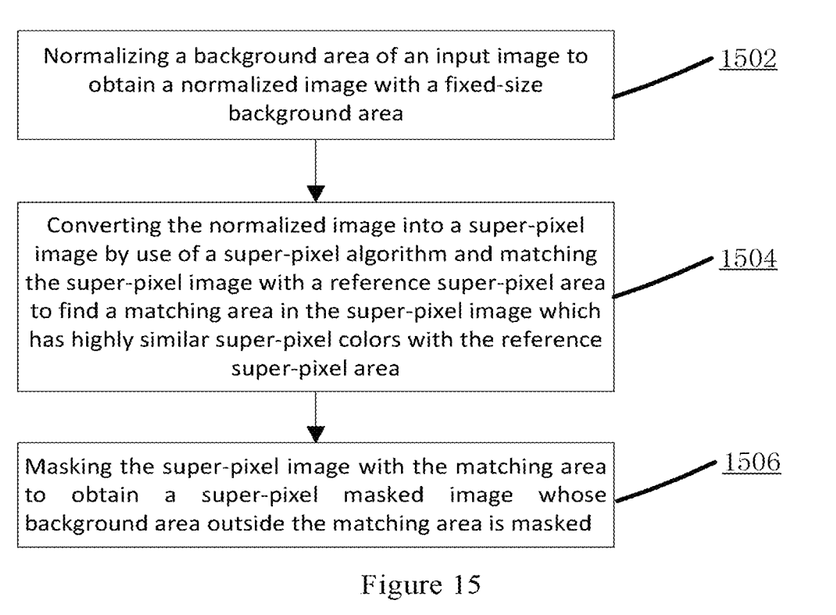
FIG. 15 is a flow chart of an object tracking method according to a first embodiment of the present invention.

FIG. 15 is a flow chart of an object tracking method according to a first embodiment of the present invention. Referring to FIG. 15, the object tracking method comprises: in step 1502, normalizing a background area of an input image to obtain a normalized image with the background area of a fixed-size; in step 1504, converting the normalized image into a super-pixel image by use of a super-pixel algorithm and matching the super-pixel image with a reference super-pixel area to find a matching area in the super-pixel image which has highly similar super-pixel colors with the reference super-pixel area; and in step 1506, masking the super-pixel image with the matching area to obtain a super-pixel masked image whose background area outside the matching area is masked, wherein the reference super-pixel area is a tracking object area of a previous frame, and the background area of the input image is an initial rectangle in the first frame of the input image or a tracking block of a previous frame of each subsequent image.

Figure 16:
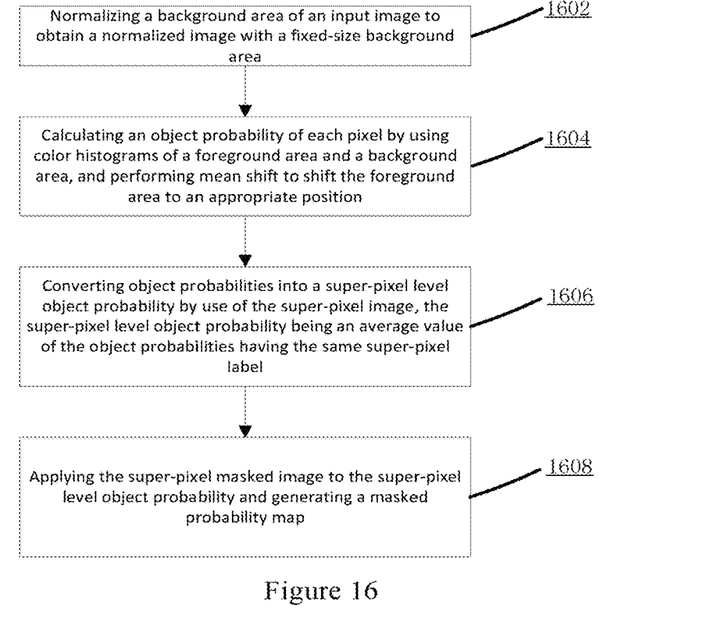
FIG. 16 is a flowchart of an object tracking method according to a second embodiment of the present invention.

FIG. 16 is a flow chart of an object tracking method according to a second embodiment of the present invention. Referring to FIG. 16, the object tracking method comprises: in step 1602, normalizing a background area of an input image to obtain a normalized image with the background area of a fixed-size; and in step 1604, after normalizing the background area of the input image, calculating an object probability of each pixel by using color histograms of a foreground area and a background area, and performing mean shift to shift the foreground area to an appropriate position; in step 1606, converting object probabilities into a super-pixel level object probability by applying the super-pixel image, the super-pixel level object probability being an average value of the object probabilities having the same super-pixel label; and in step 1608, applying the super-pixel masked image to the super-pixel level object probability and generating a masked probability map.

Particularly, generating the masked probability map further comprises: when the super-pixel masked image is labeled as the foreground, setting the probability of the masked probability map to be 1; when the super-pixel masked image is labeled as the middle-ground, setting the probability of the masked probability map to be the same as an object probability; and when the super-pixel masked image is labeled as the background, setting the probability of the masked probability map to be 0.

Particularly, the super-pixel masked image is generated through the following manner. In detail, super-pixels outside the matching area are labeled as a background of the super-pixel masked image and the background is set to be black; super-pixels inside the matching area are labeled as a foreground and the foreground is set to be white when super-pixel colors inside the matching area are similar with those of the reference super-pixel area; and other super-pixels inside the matching area are labeled as a middle-ground and the middle-ground is set to be gray when the other super-pixel colors inside the matching area are not similar with those of the reference super-pixel area.

Particularly, normalizing the background area of the input image further comprises: scaling the background area of the input image to a fixed size with a length-width ratio which is the same as that of the background area of the input image to obtain a normalized image with the fixed-size background area.

After background masking, the object area is estimated. Particularly, the process comprises the following steps: solving a Markov random field (MRF) to generate a super-pixel object binary map; calculating a final output area based on the object binary map; calculating a histogram similarity between a color histogram of the output area and a reference histogram of a previous frame to judge tracking succeed; and storing super-pixel information in the final output area.

Figure 17:
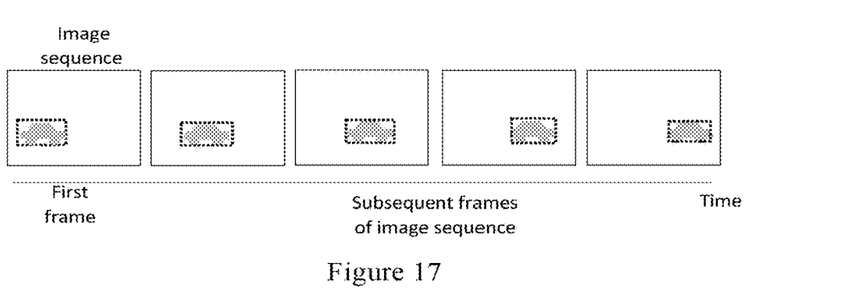
FIG. 17 shows a schematic diagram of tracking an image sequence.

FIG. 17 is a schematic diagram for tracking an image sequence. During object tracking, through a camera user initialization function, object feature data are generated as a reference histogram of the target region color.

Objects in each image sequence are tracked and tracked targets of subsequent images are tracked based on the object feature data in reference frames (reference frames specified by a user, e.g., the first frame, the second frame, the third frame, and the like). If the histogram of the final output rectangle is similar with that of the reference frames, it is judge tracking succeed. The similarity of the histograms is measured by using the Bhattacharyya distance.

Figure 18:
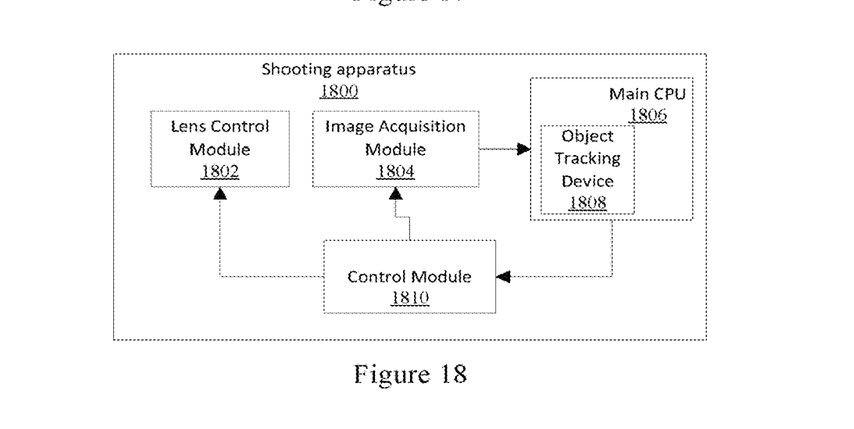
FIG. 18 is a schematic diagram of a shooting device according to an embodiment of the present invention.

FIG. 18 is a schematic diagram of a shooting apparatus according to an embodiment of the present invention. The shooting apparatus comprises a digital camera, a camera, a video camera and the like. The shooting apparatus 1800 is provided with an object tracking device. Referring to FIG. 18, the shooting apparatus 1800 comprises a processor and a memory (which are not shown in the FIG. 18), as well as a control module 1810 and an image acquisition module 1804. The processor comprises a lens control module 1802, an image acquisition module 1804, a main CPU 1806 and a control module such as an AF/AE/AWB control module 1810 in FIG. 18. In one embodiment, the main CPU 1806 comprises the object tracking device. In another embodiment, the object tracking device is not arranged in the CPU, and is a separate device. The processor comprises an image preprocessing module 402 configured to normalize a background area of an input image to obtain a normalized image with a fixed-size background area, a super-pixel matching module 404 configured to convert the normalized image into a super-pixel image by use of a super-pixel algorithm and match the super-pixel image with a reference super-pixel area to find a matching area in the super-pixel image which has highly similar super-pixel colors with the reference super-pixel area, and a background masking module 406 configured to mask the super-pixel image with the matching area to obtain a super-pixel masked image whose background area outside the matching area is masked. The control module 1810 is configured to control auto-focus, auto-exposure and auto white balance of the shooting apparatus, receive a tracked object from the object tracking device, and generate a control signal. The image acquisition module 1804 is configured to receive the shooting control signal from the control module, and acquire an image based on the shooting control signal.

The shooting apparatus 1800 with the object tracking device further comprises a lens control module 1802 configured to receive a lens control signal from the control module and control a focal length of a lens based on the lens control signal.

By applying the device and the method provided by the present invention, an object can be stably and accurately tracked, and an obstacle can be eliminated from an output area in a background masking manner, so that a shot image is clear, and the tracked object inside the tracking output area can be focused accurately.

By generating the binary map and the boundary rectangle of the target object area, an auto-focus module is prevented from focusing on a background area inside the output rectangle, and a tracked object partially overlapped with an obstacle whose color is similar or the same with the tracked object can be stably tracked. If the tracking method is used for the autofocus function of a camera, the camera can focus on a correct tracked object even if the tracked object is partially overlapped with an obstacle whose color is similar or the same with the tracked object. The method provided by the present invention can track any to-be-tracked object selected by a user through a camera's graphical user interface (GUI), and can generate the object binary map which can accurately indicate a tracking object area. By using the object binary map, the camera can keep focusing on the tracking object area with high accuracy.

The foregoing descriptions are only preferred embodiments of the present invention, and do not intend to limit the present invention. Any variation, equivalent substitution and modification that fall within the spiritual and principle of the present invention should be embraced by the protective scope of the present invention.

The invention claimed is:

1. An object tracking device including a processor and a memory, wherein the processor includes:
   an image preprocessing module that normalizes a background area of an input image to obtain a normalized image with a background area of a fixed size;
   a super-pixel matching module that converts the normalized image into a super-pixel image by a super-pixel arithmetic, and matches the super-pixel image with a reference super-pixel area for a matching area in super-pixel image which has high degree similarity of super-pixel colors with the reference super-pixel area; and
   a background masking module that masks the super-pixel image having the matching area to mask a super-pixel masked image at the background area which is outside the matching area.

2. The object tracking device of claim 1, wherein the image preprocessing module further comprises an object probability estimation sub-module, which calculates an object probability of each pixel using color histograms of foreground area and the background area of fixed size, and performs mean shift to shift the foreground area to an appropriate position.

3. The object tracking device of claim 2, wherein the super-pixel matching module converts the object probability into a super-pixel level object probability by applying the super-pixel image, and the super-pixel level object probability being an average value of the object probabilities in the same super-pixel label.

4. The object tracking device of claim 1, wherein said masking the super-pixel image having the matching area further including:
   labeling super-pixels outside of the matching area as background of the super-pixel masked image, and setting the background to be black;
   labeling super-pixels inside of the matching area as foreground when colors of the super-pixels inside of the matching area are similar to those of the super-pixels of the reference super-pixel area, and setting the foreground to be white; and labeling other super-pixels inside of the matching area as middle-ground when colors of the super-pixel inside of the matching area are not similar to colors of the super-pixel of the reference super-pixel area, and setting the foreground to be gray.

5. The object tracking device of claim 3, wherein the background masking module further applies the super-pixel masked image to the super-pixel level object probability and generates masked probability map.

6. The object tracking device of claim 5, wherein said applying the super-pixel masked image to the super-pixel level object probability and generating masked probability map further comprises:

the probability of the masked probability map is 1 when the super-pixel masked image is labeled as the foreground;

the probability of the masked probability map is the same as the object probability when the super-pixel masked image is labeled as the middle-ground; and the probability of the masked probability map iso when the super-pixel masked image is labeled as the background.

7. The object tracking device of claim 1, wherein the object area normalization sub-module scales the background area of the input image to a fixed size with a same length-width ratio of the background area of the input image to obtain the normalized image with the background area of the fixed size.

8. The object tracking device of claim 1, wherein further including an object area estimation module, solving Markov Rand Field MRF to generate a binary map of super-pixel object;

calculating a final output area based on the binary map of super-pixel object;

calculating histogram similarities between a color histogram of the output area and a reference histogram of a previous frame to judge tracking succeed; and storing a super-pixel information of the final output area.

9. The object tracking device of claim 1, wherein the reference super-pixel area is a tracking object area of a previous frame, and the background area of the input image is an initial block in a first frame of the input image or a tracking block of a previous frame of each following image.

10. An object tracking method, including:

normalizing a background area of input image to obtain a normalized image with a background area of a fixed size; and converting the normalized image into a super-pixel image by a super-pixel arithmetic and matching the super-pixel image with a reference super-pixel area for a matching area in the super-pixel image which has high degree similarity of super-pixel colors with the reference super-pixel area; and masking the super-pixel image having the matching area to mask a super-pixel masked image at background area which is outside of the matching area.

11. The object tracking method of claim 10, wherein further including: after normalizing the background area of the input image, calculating an object probability of each pixel using color histograms of a foreground area and the background area of fixed size, and performing mean shift to shift the foreground area to an appropriate position.

12. The object tracking method of claim 11, wherein further including: converting the object probability into a super-pixel level object probability by applying the super-pixel image, and the super-pixel level object probability being an average value of the object probabilities in the same super-pixel label.

13. The object tracking method of claim 10, wherein said masking the super-pixel image having the matching area further include:

labeling super-pixels outside of the matching area as background of the super-pixel masked image, and setting the background to be black;

labeling super-pixels inside of the matching area as foreground when colors of the super-pixels inside of the matching area are similar to those of the super-pixels of the reference super-pixel area, and setting the foreground to be white; and labeling other super-pixels inside of the matching area as middle-ground when colors of the super-pixels inside of the matching area are not similar to those of the super-pixels of the reference super-pixel area, and setting the foreground to be gray.

14. The object tracking method of claim 12, further including: applying the super-pixel masked image to the super-pixel level object probability and generating masked probability map.

15. The object tracking method of claim 14, wherein said applying the super-pixel masked image to the super-pixel level object probability and generating masked probability map further comprises:

the probability of the masked probability map is 1 when the super-pixel masked image is labeled as the foreground;

the probability of the masked probability map is the same with the object probability when the super-pixel masked image is labeled as the middle-ground; and the probability of the masked probability map is 0 when the super-pixel masked image is labeled as the background.

16. The object tracking method of claim 10, wherein normalizing a background area of input image further including: scaling the background area of the input image to a fixed size with a same length-width ratio of the background area of the input image to obtain the normalized image with the background area of the fixed size.

17. The object tracking method of claim 10, wherein further including an object area estimation module, solving Markov Rand Field MRF to generate a binary map of super-pixel object;

calculating a final output area based on the binary map of super-pixel object;

calculating histogram similarities between a color histogram of the output area and a reference histogram of a previous frame to judge tracking succeed; and storing a super-pixel information of the final output area.

18. The object tracking method of claim 10, wherein the reference super-pixel area is a tracking object area of a previous frame, and the background area of the input image is an initial block in a first frame of the input image or a tracking block of a previous frame of each following image.

19. A shooting apparatus having an object tracking device, includes:

an object tracking device, including a processor and a memory, and the processor including:

an image preprocessing module that normalizes a background area of input image, in order to obtain a normalized image with a background area of a fixed size;

a super-pixel matching module that converts the normalized image into a super-pixel image by a super-pixel arithmetic and to match the super-pixel image with a reference super-pixel area, in order for a matching area in the super-pixel image which has high degree similarity of super-pixel colors with the reference super-pixel area; and a background masking module that masks the super-pixel image having the matching area to mask a super-pixel masked image at the background area which is outside of the matching area, a control device that controls auto-focus, auto-exposure, and auto white balance of the shooting apparatus, receives tracking object from the object tracking device and generates a control signal; and an image capturing module that receives a shoot control signal from the control device, and captures an image based on the shoot control signal.

20. The shooting apparatus having an object tracking device of claim 19, further includes: a lens control module which receives a control signal for controlling the lens from the control device, and controlling a focus length of the lens based on the control signal of the lens.

* * * * *